United States Patent
Parma et al.

[11] Patent Number: 5,190,392
[45] Date of Patent: Mar. 2, 1993

[54] ROBOT-FRIENDLY CONNECTOR

[75] Inventors: George F. Parma, Houston; Mark H. Vandeberghe, Friendswood; Steve C. Ruiz, Houston, all of Tex.

[73] Assignee: The United States of America as represented by the Administrator of the National Aeronautics and Space Administration, Washington, D.C.

[21] Appl. No.: 799,460

[22] Filed: Nov. 26, 1991

[51] Int. Cl.⁵ .............................. F16B 1/04
[52] U.S. Cl. .................. 403/171; 403/176; 403/353; 403/381; 52/465
[58] Field of Search ............ 403/171, 172, 176, 6–8, 403/381, 353; 52/645, 646, 648; 44/383, 384; 74/89.3, 89.15

[56] References Cited

U.S. PATENT DOCUMENTS

| | | | |
|---|---|---|---|
| 1,024,754 | 4/1912 | Walker | 403/8 X |
| 1,048,096 | 12/1912 | Ray | 403/8 |
| 3,264,019 | 8/1966 | Youvener et al. | 403/8 X |
| 3,982,841 | 9/1976 | Endzweig | 403/19 |
| 4,334,797 | 6/1982 | Wahlin | 403/252 |
| 4,438,615 | 3/1984 | Wendel | 403/176 X |
| 4,465,115 | 8/1984 | Palomera . | |
| 4,509,882 | 4/1985 | Lautenschlager, Jr. | 403/402 |
| 4,579,474 | 4/1986 | Rock et al. | 403/245 |
| 4,637,193 | 1/1987 | Lange | 403/176 X |
| 4,692,054 | 9/1987 | Kirby | 403/171 |
| 4,915,532 | 4/1990 | Radclyffe | 403/171 |
| 4,932,808 | 6/1990 | Bär et al. | 403/170 |
| 4,974,987 | 12/1990 | Smock | 403/252 |
| 5,007,762 | 4/1991 | Duran | 403/341 |

FOREIGN PATENT DOCUMENTS 1294500  4/1962  France ................. 403/171

Primary Examiner—Randolph A. Reese
Assistant Examiner—Harry C. Kim
Attorney, Agent, or Firm—Russell E. Schlorff; Guy M. Miller; Edward K. Fein

[57] ABSTRACT

Robot-friendly connectors, which, in one aspect are truss joints with two parts, a receptacle and a joint, the joint having a head which is loosely inserted into the receptacle and is then tightened and aligned; in one aspect, the head is a rounded hammerhead which initially is enclosed in the receptacle with a sloppy fit provided by the shape, size and configuration of surfaces on the head and on the receptacle.

13 Claims, 6 Drawing Sheets

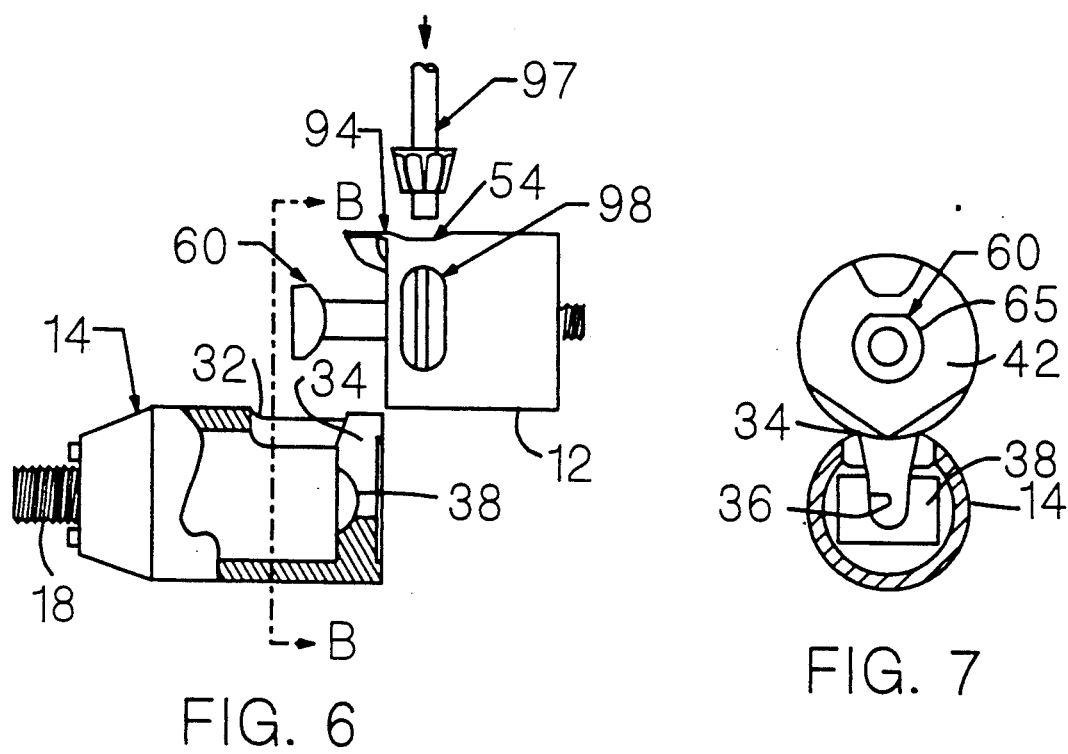
FIG. 6
FIG. 7
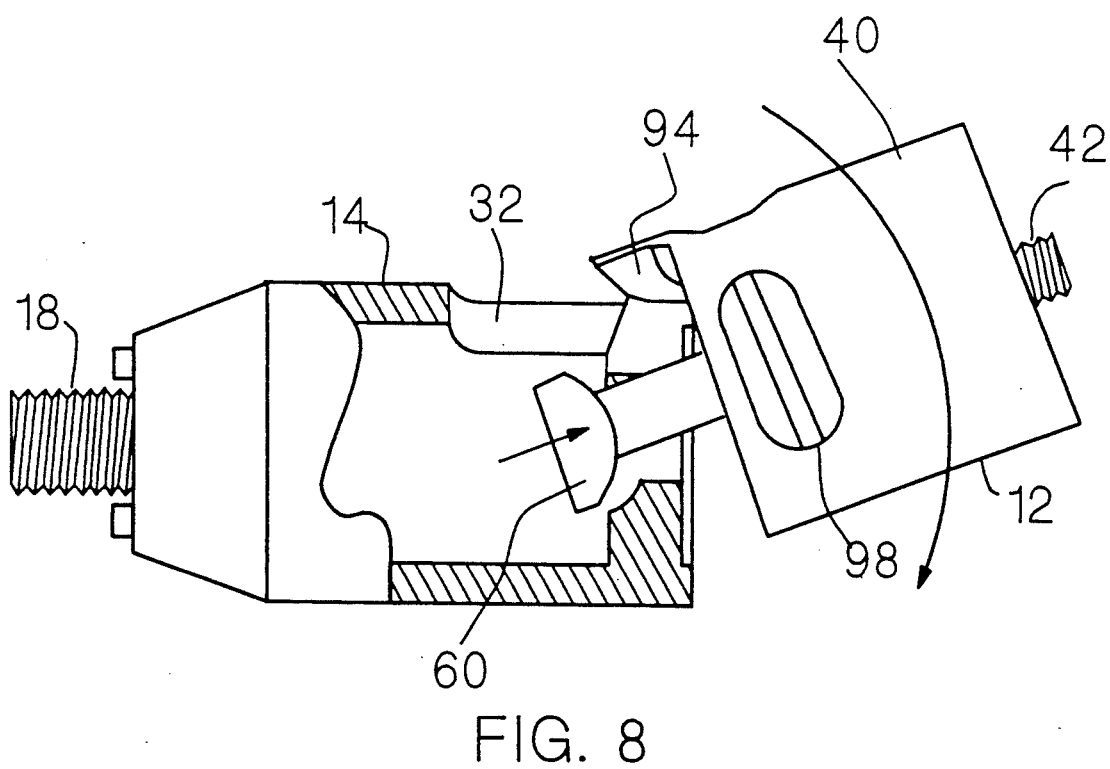
FIG. 8

ROBOT-FRIENDLY CONNECTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention is directed to the field of connectors and fasteners; in one particular aspect to a robot-friendly connector; and in another particular variety of environments, including but not limited to, under water and in extra vehicular activity in outer space.

2. Description of Related Art

In the past space structures and vehicles to be used in outer space have been launched as completely assembled and integrated systems. The size of proposed structures and vehicles has become prohibitively large to launch as complete assemblies. One alternative is to launch the structures in pieces and assemble them on orbit or on another celestial body. Structures which are assembled on location can usually be constructed out of lighter, more efficient sub-components because they do not have to withstand launch and landing loads in their as-assembled configurations. Assembly and maintenance of many of these structures will be accomplished by astronauts or by robotic devices.

Due to life support requirements and the numerous lengthy and monotonous steps to perform, human assembly of structures such as trusses in outer space is an inefficient endeavor. Extra-vehicular activity time for space station assembly missions is limited to 24 man-hours per flight, and there are numerous other more difficult and less monotonous tasks which would be better suited for an astronaut. A better approach delegates such repetitive and well-structured tasks to robotic devices. Structural assembly is repetitious, well structured, and labor intensive; it is therefore well suited for complete automation. "Robot-friendly" hardware for such assembly is very desirable. Such hardware incorporates many of the principles generally associated with design-for-assembly principles, e.g., simple insertion operations, generous lead-in chamfers, and self-aligning parts.

Various joint devices have been designed for building trusswork in outer space. These are generally in two categories: 1) hand-operated joints and 2) tool-assisted joints. With hand-operated joints truss members are assembled by extra vehicular activity ("EVA") astronauts wearing pressurized gloves. Tool assisted joints are assembled either by an EVA astronaut using a tool or by a robotic device using a special-purpose gripper.

Critical to the design of hand-operated fasteners is the ease with which a gloved astronaut can assemble hundreds of joints by hand without excessive fatigue or glove wear. These requirements have forced a compromise for simplicity of operation at the price of weight, complexity and cost. Each joint has its own internal actuating mechanism as well as an external mechanism (e.g., a lever or collar) which adapts the connector to the gloved astronaut's hand. Thus, the tool necessary to tighten the joint is part of each single unit. The designers of these joints have assumed that whatever motion an astronaut makes to operate this joint, a robot could be made to do as well. However, in order to duplicate these operations, the robot must perform extremely difficult motions and/or the gripper must incorporate an additional mechanism which allows it to mimic the motions of a gloved astronaut. This duplication results in a very complex overall system.

Tool-assisted fasteners requiring two-handed operation by gloved astronauts are cumbersome and virtually impossible to assemble with a single robot arm. Others have incorporated a mechanism including a tool which allows them to be operated with a simple motion (for an astronaut) such as a 90° rotation of the tool. This motion is difficult for a robot arm and the design is unnecessarily complicated.

Another major disadvantage shared by prior designs is that they are very intolerant of large misalignments. Large insertion forces are required to fit together most of these joints with small linear or angular mismatch. Manufacturing tolerances or thermal distortion can easily cause excessive alignment error. A robot may introduce additional error due to gripper misalignment, deflection or compliance in the manipulator structure and joints, inaccuracies in the drive system, and inaccuracies in jigs which hold the truss during assembly. In terrestrial applications, parts of robots, e.g. arms, comply due to gravity so that a position indicated by a computer control may be inaccurate. Also, robots are machines which are subject to hysteresis, thermal expansion and friction. Prior art fasteners were not designed to accommodate such misalignments and are unsuitable for automated assembly.

Pending U.S. patent application Ser. No. 07/824,806 entitled "Quick Connect Fasteners for Assembling Devices in Space" filed on Mar. 15, 1992 discloses a robot-compatible joint for EVA use. The joint has threadedly-advanced expander rod which forces a set of collet fingers to expand outward into a receptacle to achieve connection. End effector drive engagement is accomplished by using a section of commercially available flexible drive shafting with an allen head wrench welded to the end. Before connection, the entire collet assembly is held inside the joint body by a light compression spring force. The joint halves are moved together with the assistance of a two-fingered external guide. Clocking (orientation of a joint about the strut axis) is performed by a wedge protruding from the joint face which engages a matching receptacle on the scar as the two halves are moved together. Then, the flex drive is inserted into a slot in the joint body. The top of the allen head wrench simply slides along the inside wall of the body, up a conical ramp, and into a matching hex hole in the end of the collet assembly. Continued axial pressure by the flex drive overcomes the compression spring force, and pushes the collet assembly out of the joint body and the collet fingers are extended into the receptacle. Rotating the flex drive at this point begins to advance the expander rod so that it forces the collet fingers outward. This joint requires only a low input torque to achieve a 3,000 lb. preload as a result of the collet's wedging action combined with its threaded actuation.

U.S. Pat. No. 3,982,841 discloses a node/strut assembly joint and method of attachment. A "T" head is inserted into a rectangular slot in the node ball. A screw which is mounted in relation to the strut axis, is rotated to cause a nut to turn within the joint through a coupling pin. As the threaded nut turns within the joint, the bolt is drawn into the joint forming an attachment. The "T" head is not used to aid in aligning the connector. It is inserted axially and then must be turned 90° about the strut axis in order to effect a connection. A tool must then be inserted into the nut and rotated about the strut axis in order to tighten it. This sequence of operations would be very difficult for a robotic device to perform.

U.S. Pat. No. 4,334,797 discloses a coupling element with an arched, wedged distal end which is easily guided into a coupling element. A threaded screw is inserted through the side of the receiving coupler and tightened to lock the elements together.

U.S. Pat. No. 4,465,115 discloses a hammer with a head having a means for accepting a nail through a side entrance to guide the nail to its destination. The nail is easily released after the hammer is used to start the nail.

U.S. Pat. No. 4,509,882 discloses a furniture joint fastener. Fastening two furniture elements involves aligning oval elements until one is seated within the other. A cross shaped receiver is then turned camming the two furniture elements together.

U.S. Pat. No. 4,579,474 discloses furniture assembly and illustrates a means of using a cammed element to draw together two elements arranged normal to one another. A wide opening is available allowing easy entry to the bolt mechanism.

U.S. Pat. No. 4,974,987 discloses a strut/node joint having a hooked wire within the strut which is coupled to a cammed bolt. The wire is inserted into the node receptacle and the bolt is turned camming the hook into the strut. This provides a secure attachment rapidly.

U.S. Pat. No. 5,007,762 discloses a strut/joint having a receptacle with a side entry means. This joint has been proposed for EVA activity. A spring-loaded bolt in the strut is used to lock the coupling following attachment of the joint to the receptacle. This patent discloses the use of side entry to begin a connection process. This joint is very unforgiving of certain misalignments prior to insertion due to the tight fit between end and cavity. It relies on this tight fit in order to provide a load path between the two joint halves after fastening, but it imparts relatively little preload to the connection, and preload is an essential element in maintaining linearity in an overall truss structure.

There has long been a need for a truss joint which is robot-friendly. There has long been a need for such a joint whose assembly can be automated and can be accomplished during EVA.

SUMMARY OF THE PRESENT INVENTION

The present invention discloses connectors and, in one particular aspect, truss joint connectors. Truss joints are a means of attaching truss members to a central point of load transmission, e.g. to a node ball, to form a complete truss structure as shown in FIG. 1. Truss connectors consist of two primary components: the receptacle and the joint.

The receptacle is that part of the connector which is attached to a node ball. It is attached to the node ball via a bolt inside the receptacle. A pair of clocking pins serve to orient and precisely align the receptacle with the node ball. In this embodiment, the receptacle has a head recess for receiving and holding a head of a joint.

A truss joint, in one preferred embodiment according to this invention, is that part of the fastener which is attached to a truss member, e.g., a tubular strut. The joint (a "hammerhead joint") is attached to the strut, e.g., but not limited to, attachment with adhesive or by screwing onto the strut via threads in the open end of the housing. Protruding from the opposite end of the housing is a hammerhead which is screwed onto a shaft and constrained from rotation by a spring pin. Upon tightening of the joint the hammerhead seats snugly inside the head recess within the receptacle. The opposite end of the shaft is also externally threaded to engage the internal threads of a carriage nut. The carriage nut has a pair of ears on its outside which ride in slots in the carriage. These ears force the carriage nut to rotate along with the carriage, but still allow it to translate freely along the joint's axis. A retaining ring holds the carriage nut in position and the nut, in turn, holds a stack of belleville spring washers against the inside surface of the carriage. The carriage rides around a sleeve inside the housing with its front face pressing against a thrust washer. A ring gear is also pressed into the carriage, and its teeth are visible through a chuck key receptacle. The retaining ring holds the carriage nut inside the housing. The joint has a pair of alignment grooves on either side of the housing which are used by a robot gripper to align the joint upon gripping, both axially and in clocking as it is grasped. "Clocking" refers to the orientation of a joint about the strut axis.

The hammerhead itself has a useful shape which includes, in one embodiment, two intersecting cylindrically shaped surfaces. These intersecting cylindrical shapes allow the fastener to tolerate and recover from misalignments (e.g. misalignments of longitudinal axes and clocking of the parts, as well as overlapping parts).

The hammerhead joint operates by inserting the dual-cylindrical head into a wide, well-chamfered hole. Final alignment is achieved by using the joint's actuation as it is tightened. A connector according to this invention, in certain preferred embodiments, uses a threaded bolt and a nut whose threads are always engaged with the threads of the bolt, thereby eliminating the possibility of unwanted cross-threading. As the two halves of the joint slide together, clocking may be accomplished in a variety of ways. For example, a tongue protruding from the front of the housing may co-act with a correspondingly shaped chamfered slot in the receptacle. Clocking may also be accomplished by flats on either side of the retracting bolt conforming to the flat sides of the slotted receptacle. The chuck key is inserted, and rotated, thus turning the ring gear and nut. Thus, the joint is drawn into alignment as the dual-cylindrical head seats itself in the mating receptacle.

Certain previous fasteners designed for the human hand are extremely difficult to operate robotically, especially those with rotating collars or with levers that must be flipped. Such designs require the robot to utilize an additional interface on top of this human-adapted interface, thus increasing the overall complexity of the system. This invention replaces the human-adapted interface with a simpler one which will work for both humans and robots. The joint in certain embodiments, is simpler, lighter, and cheaper.

It is, therefore, an object of the present invention to provide new, useful, unique, efficient, safe and effective devices and methods for joining members together.

Another object of the present invention is the provision of such devices and methods for joining truss members together, particularly in outer space.

Yet another object of the present invention is the provision of such methods and devices which are robot-friendly and easily automated.

An additional object of the present invention is to provide such methods and devices for use on the earth and under water.

Another object of the present invention is the provision of such devices and methods which have an internal bolt and nut which cannot be cross-threaded.

Yet another object of the present invention is the provision of such devices which are easier to assemble, both by humans and by robots.

The present invention recognizes and addresses the previously-mentioned long-felt needs and provides a satisfactory meeting of those needs in its various possible embodiment. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIGS. 6, 7, and 8 illustrate the operation of the connector of FIG. 3. FIG. 6 shows a joint with its head above an opening in a receptacle. FIG. 7 is a view along line B—B of FIG. 6. FIG. 8 shows the joint head after it has been received in the receptacle with the receptacle and joint misaligned prior to tightening.

Photograph I shows a connector according to the present invention with the joint and receptacle apart. Photograph II shows the two parts tightened together. Photograph III shows a robot assembling the connector.

DESCRIPTION OF EMBODIMENTS PREFERRED AT THE TIME OF FILING FOR THIS PATENT

Figure 1:
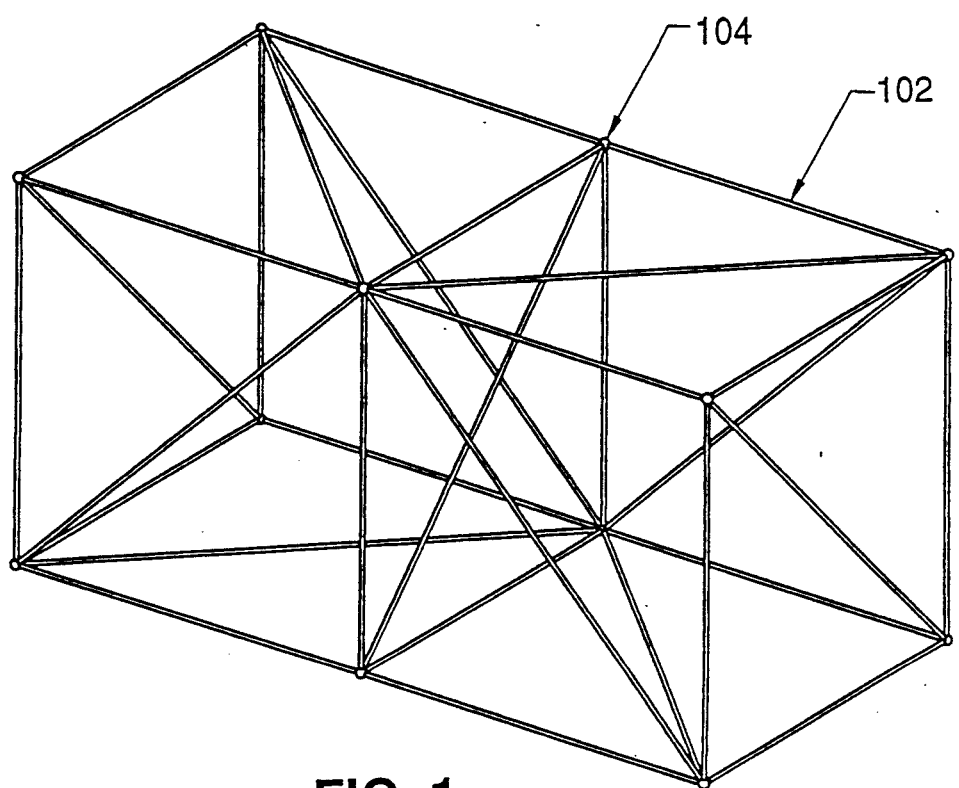
FIG. 1 is a schematic view of a general prior art truss structure.
Figure 3:
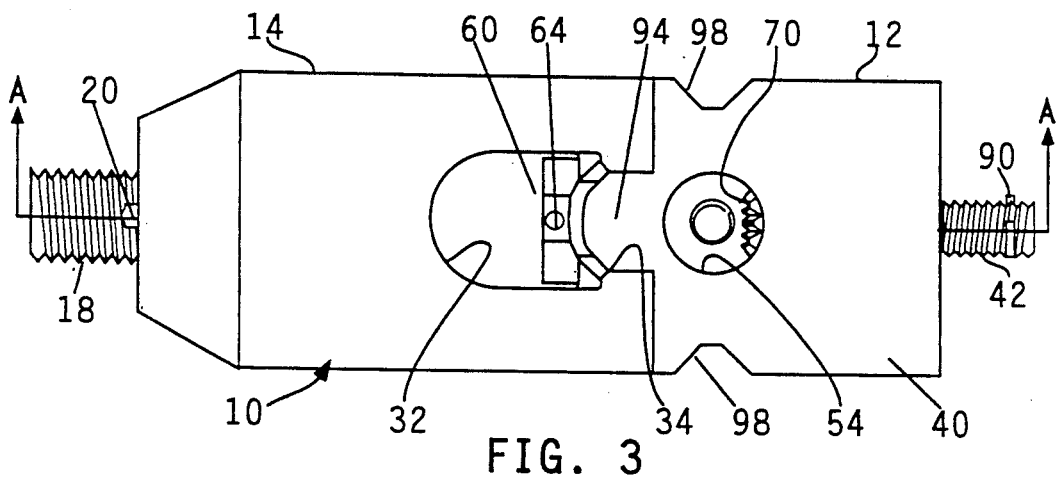
FIG. 3 is a top view of a truss connector according to the present invention.
Figure 4:
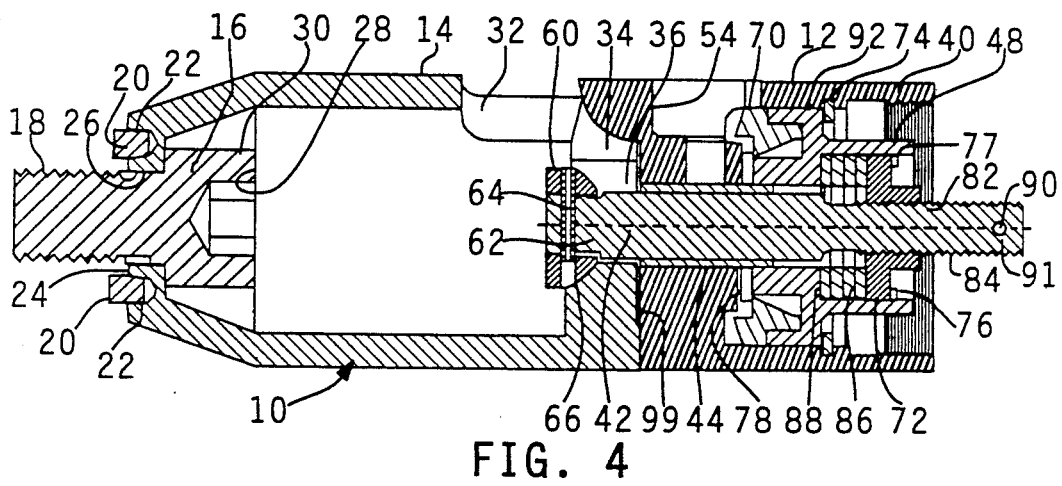
FIG. 4 is a cross-sectional view along line A—A of FIG. 3.
Figure 5:
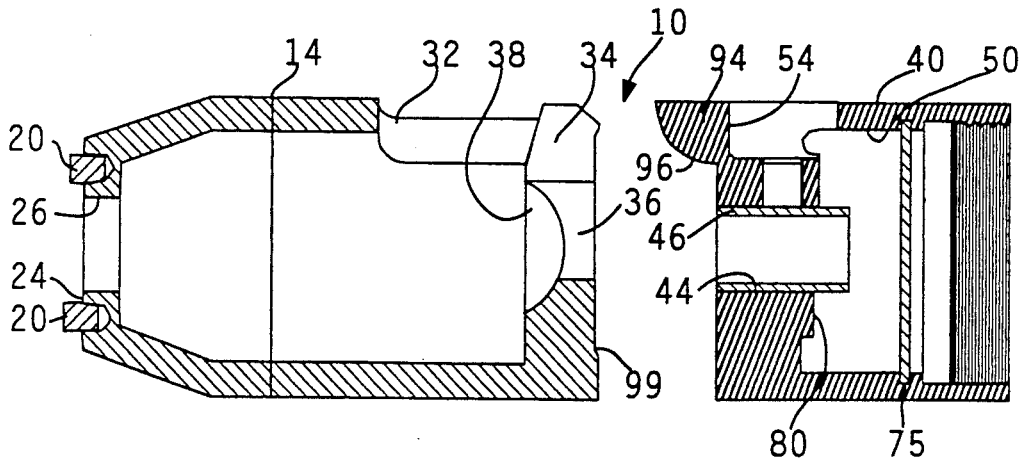
FIG. 5 is a cross-sectional view of a connector receptacle and housing as shown in FIG. 4.

FIGS. 3-5 show a connector 10 according to the present invention. A joint 12 is received in and held in a receptacle 14. A bolt member 16 is secured in the receptacle 14 with a bolt end 18 projecting therefrom through an opening 26 for secured connection to a structural member (not shown in FIGS. 3-5) such as, but not limited to, a node ball as shown in Photograph I and FIG. 1. Correct orientation of the receptacle 14 with respect to the node ball is achieved by two clocking pins 20 secured by a press fit in recesses 22 in an end 24 of the receptacle 14. These pins are received in and held in corresponding recesses in a node ball so that the receptacle and node ball are properly aligned. The bolt 18 is tightened by inserting a hex-head tool (not shown) into a hex opening 28 in an end 30 of the bolt member 16.

The receptacle 14 has a top opening 32 through which a portion of a joint is inserted into the receptacle 14. This opening is, preferably, sized so that it is significantly larger than the portion of the joint to be inserted. Adjacent the opening 32 is a chamfered entry 34 to a slot 36 for holding a portion of a joint. An interior recess 38 in the receptacle 14 is, preferably, fashioned and configured to correspond to part of a head portion of a joint so that the head portion is movable to be seated in and held in the recess 38 by tightening of the joint.

The joint 12 has a housing 40 which contains the head structure and the mechanism for tightening the joint. A bolt 42 extends in, through, and out from a channel 44 in the housing 40. A portion of the bolt 42 is within a sleeve 46 (made, preferably, from aluminum-bronze bearing material) such that the bolt 42 can slide linearly through it. The sleeve 46 also centers a carriage 48 disposed in a space 50 within the housing 40. A chuck key (not shown) is inserted into an opening 54 in the housing 40.

A hammerhead 60 is secured on an end 62 of the bolt 42, both by threaded co-action of these two members and by a spring pin 64 inserted through the hammerhead 60 and into the bolt 42. A part 66 of the hammerhead 60 is received in the recess 38 as the joint is tightened.

The joint is tightened by first inserting a chuck key into the opening 54 to engage a ring gear 70 and then rotating the chuck key. The ring gear 70 is secured to the carriage 48 and a carriage nut 72 is keyed to and engaged with the carriage 48. The carriage 48 is rotated by the action of the chuck key on the ring gear 70. The carriage nut 72 has internal threads 82 which threadedly mesh with threads 84 of the bolt 42. The bolt 42 is keyed to the sleeve 46 which is pressed into the housing 40 so that it cannot rotate and so that turning of the carriage nut 72 results in a linear translation of the bolt 42.

A retaining ring 74 in a groove 75 holds the carriage 48 in place in the space 50 and a retaining ring 76 in a groove 77 prevents the carriage nut 72 from sliding out of the carriage 48. A thrust washer 78 preferably made of low friction material (e.g. a hard material with a low friction coating such as PTFE-lead overlay) permits the carriage 48 to rotate with respect to an interior surface 80 of the housing 40. Belleville springs 86 are provided between the carriage nut 72 and an interior surface 88 of the carriage 48. A cotter pin 90 extending through a hole 91 in the bolt 42 can be used to prevent the bolt 42 from becoming completely disengaged from the carriage nut 72. The thick black area 92 indicates clearance space between the carriage and the housing.

A tongue 94 of the housing 40 has a rounded portion 96 which contacts and moves on the chamfered entry 34 as the joint is tightened. Guide grooves 98 in the housing 40 provide a holding recess for gripping devices (e.g. of a robot, not shown) to grip the joint 12.

The belleville spring washers are deflected at the end of the joint tightening process, creating a preload at the joint interface. Joints not having such washers in the load path tend to lose their pre-load very easily when used to assemble large truss structures.

When tightening these connectors, the moment arm available (e.g., the radius of the strut tube) for straightening out the tube is extremely short (one inch maximum in certain embodiments), whereas any sideways resistance forces along the tube have the entire length of the tube for a moment arm. In the laboratory, when a strut with a joint on its end was bolted vertically and preloaded (without any belleville spring washers) then released, the joint completely loosened. To prevent this phenomenon from occurring, belleville washers were included which build up their preload over many thousandths of an inch of deflection. Thus, when a truss tube rights itself after being released, the "relaxation" of a few thousandths of an inch only minimally reduces the preload. Also, by using this belleville arrangement, a motor can apply preload torque which ramps up to the full preload torque value over a longer time period, extending the life of the bolt tightener's drive train.

In one preferred embodiment, a hammerhead is positioned so that it protrudes approximately one inch beyond the surface of the joint housing to prepare the joint for insertion into the receptacle. Approximately 1/16th of an inch of clearance on all sides of the head as it is inserted through the insertion hole is preferred. For greater misalignments, cylindrical parts of the hammerhead and the shaft slide with a camming action against the chamfers around the entry to the insertion hole in the receptacle to guide the head and shaft into the receptacle with minimal insertion force. The open end of the receptacle is actually trapped between the hammerhead and the front face of the joint housing as the two parts slide together. Finally, the tongue at the top of the housing removes any residual clocking misalignment left between the two parts of the connector as the hammerhead is seated in the receptacle. In the embodiment shown in photographs I-III, the joint member has no tongue.

FIGS. 6 and 7 show normal connector operation. A standard chuck key 97 is inserted into the chuck key opening 54 where it engages teeth of the ring gear 70. When the chuck key 97 is turned, it rotates the carriage 48 which also rotates the carriage nut 72 about the bolt 42. The bolt 42 is retracted into the housing, pulling the hammerhead 60 into the recess 38 inside the receptacle 14. Continued rotation of the chuck key 97 after the hammerhead 60 is seated causes the carriage nut 72 to move forward in the carriage 48. This action compresses the belleville spring washers 86 and preloads the interface between the receptacle 14 and the joint 12, completing the structural connection. Disassembly is the reverse of the preceding process. A recess 99 machined into the receptacle 14 ensures that an efficient load path is maintained between the two halves of the joint by permitting contact only around the circumference of the joint.

Within the scope of this invention, the action of rotating the carriage nut 72 may be accomplished by alternate methods. Alternate gear arrangements could be used to drive the carriage, e.g., worm gears, bevel gears, etc. A flexible drive shaft can be inserted into a slot in the side of the truss member which could then be used to drive the nut. If the joint is not installed in a truss tube (i.e., the end is open), a socket wrench might be inserted to actuate it. Other methods may also be employed, within the scope of this invention, to retract the hammerhead. These include a wedge drive in from the side, or a handle which is rotated through some arc to actuate a linkage to retract and preload the head. The receptacle does not need to be attached to a node ball, but might be attached anywhere on a larger structure as a general attachment point.

When compared to prior art, connectors according to the present invention have a relatively large capture envelope or "sloppy fit" between parts when the hammerhead is initially inserted into the receptacle. Connectors according to certain preferred embodiments of this invention pull themselves together properly during the tightening process even when extreme misalignment conditions exist as shown in FIG. 8. Other joints jam under these conditions, thus failing to make a proper structural connection.

Certain preferred embodiments of the present invention can be made of simple, easy-to-mass-produce parts, which are lightweight, and, as structural testing shows, have excellent stiffness properties. Most significantly, certain preferred embodiments of this invention can recover from lateral misalignments as large as 0.4 inches and rotational misalignments as large as 28° and still produce a sound structural connection. This makes it an excellent choice for use with a robotic device, since such misalignments may be difficult to judge from the human operator's work station or by a supervisory computer during autonomous operations. The shape of the head and corresponding recesses accommodate large misalignments, and improve the joint's ability to pull together properly as it is tightened.

Certain prior art joints try to perform most of the final alignment of mating halves during an insertion phase so that only minimal motion is then necessary before they are fully tightened. This methodology can result in high forces and jamming under large misalignments. With certain embodiments of this invention, alignment and tightening are treated differently. The joint goes together very loosely ("sloppy fit") while grossly aligning itself, producing very low forces and rarely jamming. During the tightening phase, the head is able to produce very large alignment forces as it is drawn into its seat. This gives it the power to drive out all residual misalignments and thus complete a solid structural connection.

The "inverse-nut" arrangement (where the nut is turned, pulling the bolt head in) makes starting the bolt into the nut unnecessary, thus eliminating cross-threading problems while at the same time getting all the advantages of a simple nut and bolt connection. The threads are contained inside the housing where they will not be damaged.

Certain preferred embodiments of joints according to this invention satisfy some or all of a variety of design requirements as listed in Table I.

TABLE I

| | |
|---|---|
| Design loads: | ±1140 lb. axial |
| | ±2620 in.-lb. bending |
| Preload after tightening: | 3000 lb. |
| Capture envelope: | ±0.10″ linear |
| | ±3.0° angular |
| Sideways insertion. | |
| One robot arm fastening operation. | |
| Joint must be clocked & torsion countered via a positive mechanism (not friction alone). | |
| Alignment guide should be provided as part of the end effector if possible to help pull joint parts together. | |
| A "soft capture" device unnecessary. | |
| Vision system fiducials (reference markings) on joint & receptacle; good visual verification to confirm that a sound connection has been made. | |
| EVA backup operation. | |

"±0.10″ linear" indicates the distance the joint halves, in this embodiment, can be misaligned in translation. "±3.0° angular" indicates the number of degrees of rotation that the two halves of the joint, in this embodiment, can be mismatched in orientation. Vision system fiducials may be reference marks used by a computerized vision system. Good visual verification is an advantage over other joints (e.g. the collet joint) where high activation torque may be mistaken for a sound connection when in actuality the joint has undesirably cross-threaded.

A "soft capture" device is a mechanism which loosely connects a joint such that a person can let go of the strut without it coming apart. Typical prior art soft capture devices include bolt-detent systems, spring clips, and other lightly spring-loaded mechanisms. "Soft capture" has always been a requirement for EVA joints. Videos of the crew assembling trusses in both the simulation tanks and an orbit show the reason: manipulating and actuating the joint is necessarily a two-part task in order to prevent accidental triggering of the joint; and "soft capture" allows the crewman to change his grip location from manipulation to actuation. However, in certain embodiments by using a new assembly sequence, an end effector need not let go and re-grip the joint, and so there was no need for such a feature in these embodiments.

Figure 9:
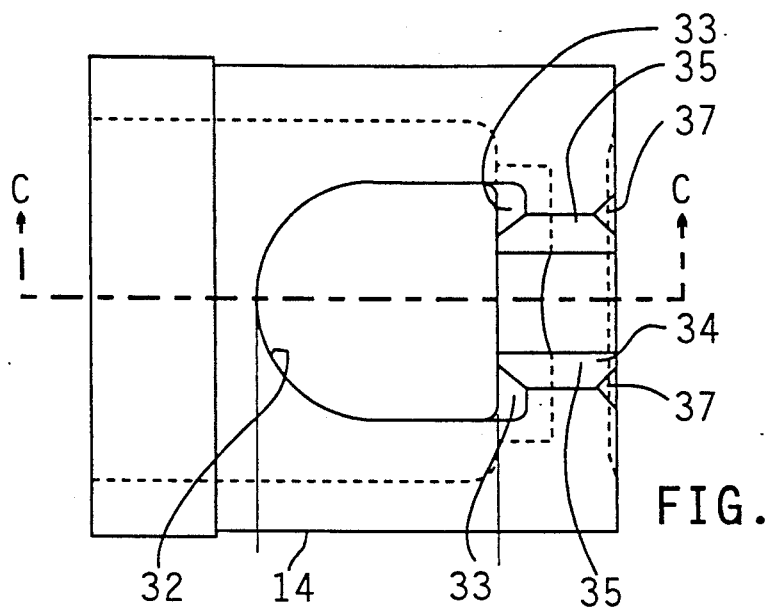
FIG. 9 is a top view of the receptacle of FIG. 4.
Figure 10:
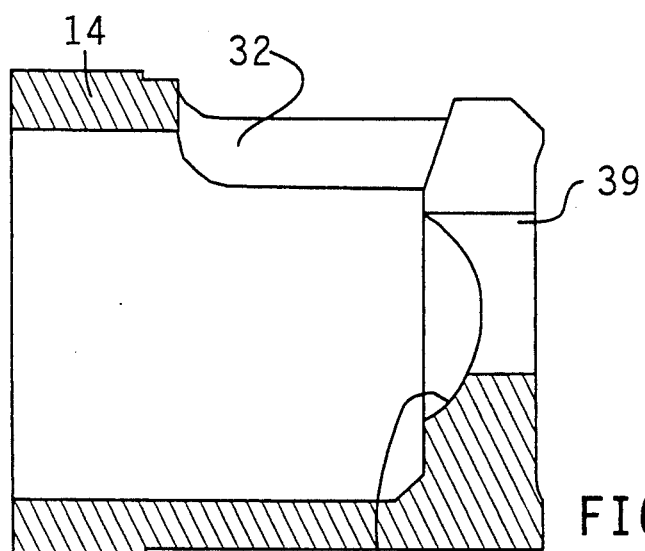
FIG. 10 is a view along line C—C of FIG. 9.
Figure 11:
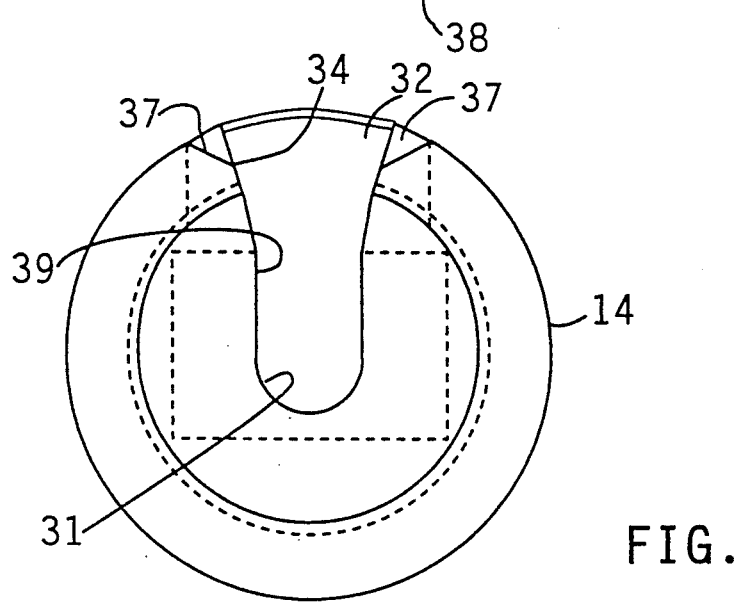
FIG. 11 is an end view of the receptacle of FIG. 9.

FIGS. 9, 10, and 11 show the detail of the receptacle 14 (FIG. 3-5). The opening 32 has end chamfers 33 for facilitating the insertion of the hammerhead 60 and part of the bolt 42 into the interior of the receptacle 14. The chamfered entry 34 has two chamfered portions 35 which also facilitate such insertion and on which the tongue 94 of the housing 40 of the joint 12 is movable to accommodate receptacle-joint misalignment. The chamfered portions 37 also function to facilitate insertion when in contact with surfaces 95 of the housing 40; i.e., when the parts of the joint are too close together and overlapping surfaces 95 will slide upon the chamfers 37 so that the two halves will move apart, allowing insertion. The slot 36 includes the chamfered entry portion 34 and a narrower portion 39. A semicircular portion 31 functions as a stop so that the shaft of the bolt 42 comes to rest during joint insertion.

Figure 12:
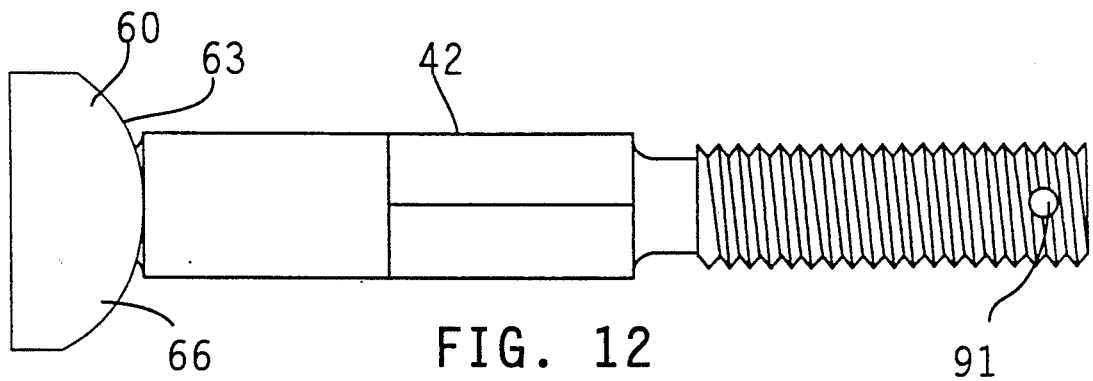
FIG. 12 is a side view of a bolt used in the connector of FIG. 3 with a hammer head attached.
Figure 13:
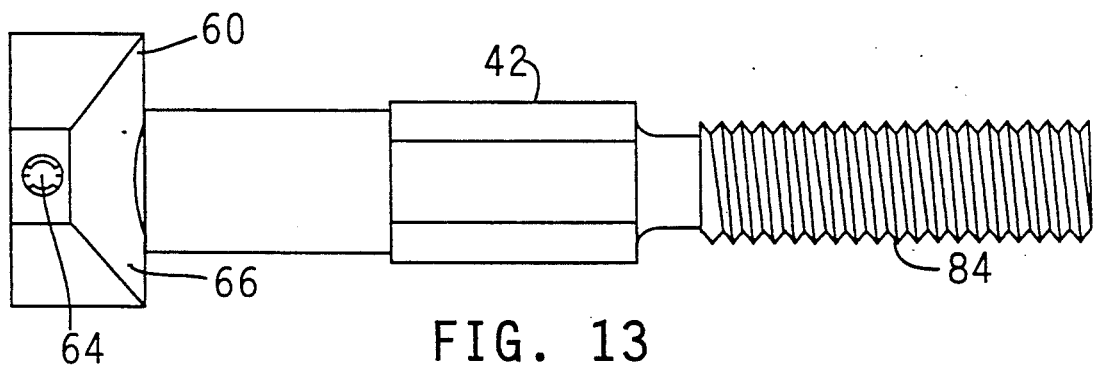
FIG. 13 is a top view of the bolt and head of FIG. 12.
Figure 14:
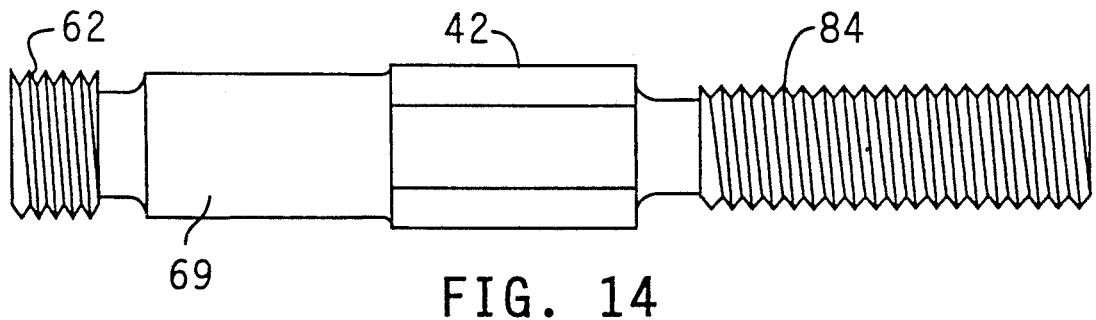
FIG. 14 shows the bolt alone.
Figure 15:
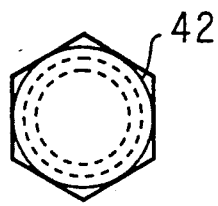
FIG. 15 is an end view of the bolt of FIG. 14.

FIGS. 12, 13, 14, and 15 show details of the bolt 42 and the hammerhead 60. The two intersecting cylindrical portions of the hammerhead allow the connector to tolerate and recover from misalignments. One cylindrical portion 63 is shown in FIG. 12. Another cylindrical portion 65 is shown in FIG. 7. Clocking of the bolt 42 is accomplished by the tongue 94 alone without the need for flats on the bolt. (Clocking of the bolt 42 with respect to a slot like the portion 39 of the slot 36 may be accomplished by providing flats on the bolt 42 at an area 69.)

Figure 16:
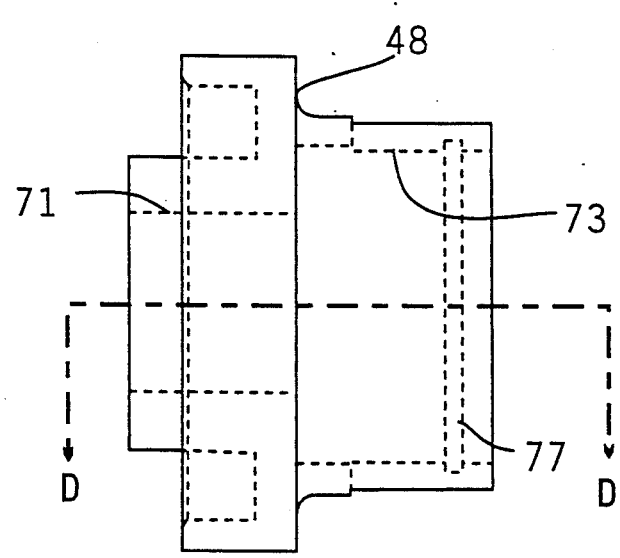
FIG. 16 is a top view of a carriage used in the housing shown in FIG. 4.
Figure 17:
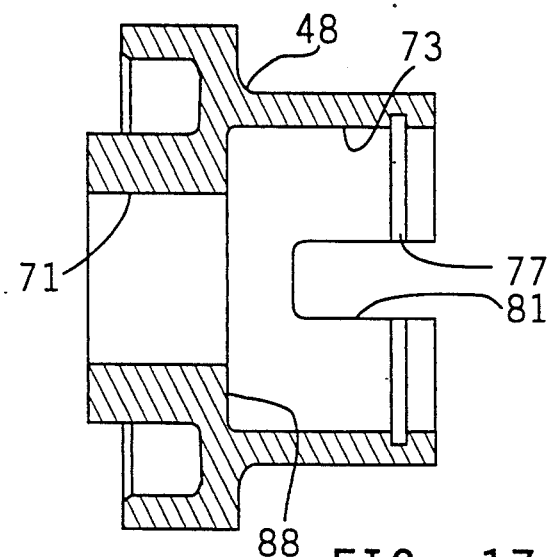
FIG. 17 is a view along line D—D of FIG. 16.

FIGS. 16 and 17 show the carriage 48. The bolt 42 extends through a channel 71 and through a larger channel 73 in the carriage 48. A portion of the sleeve 46 (FIGS. 4,5) extends into the channel 71 and helps to center the carriage 48.

Figure 18:
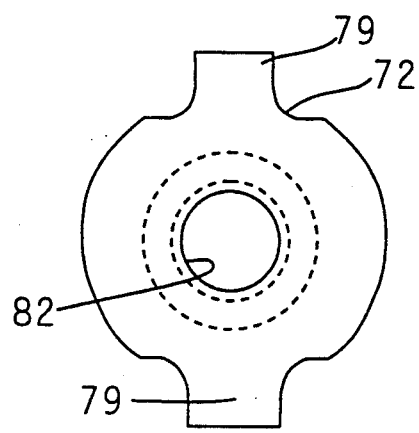
FIG. 18 is a front view of a carriage nut shown in the housing in FIG. 14.
Figure 19:
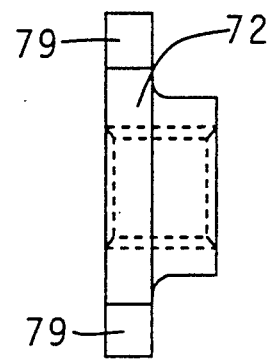
FIG. 19 is a side view of the nut of FIG. 18.

FIGS. 18 and 19 show the carriage nut 72 which has ears 79 which extend into the slot 81. The ears 79 captured in the slot 81 key the carriage nut 72 to the carriage 48 so that as the carriage turns the carriage nut turns. The slot 81 allows the nut to translate slightly on the bolt 42 in order to compress the belleville spring washers 86 during joint tightening.

Figure 2:
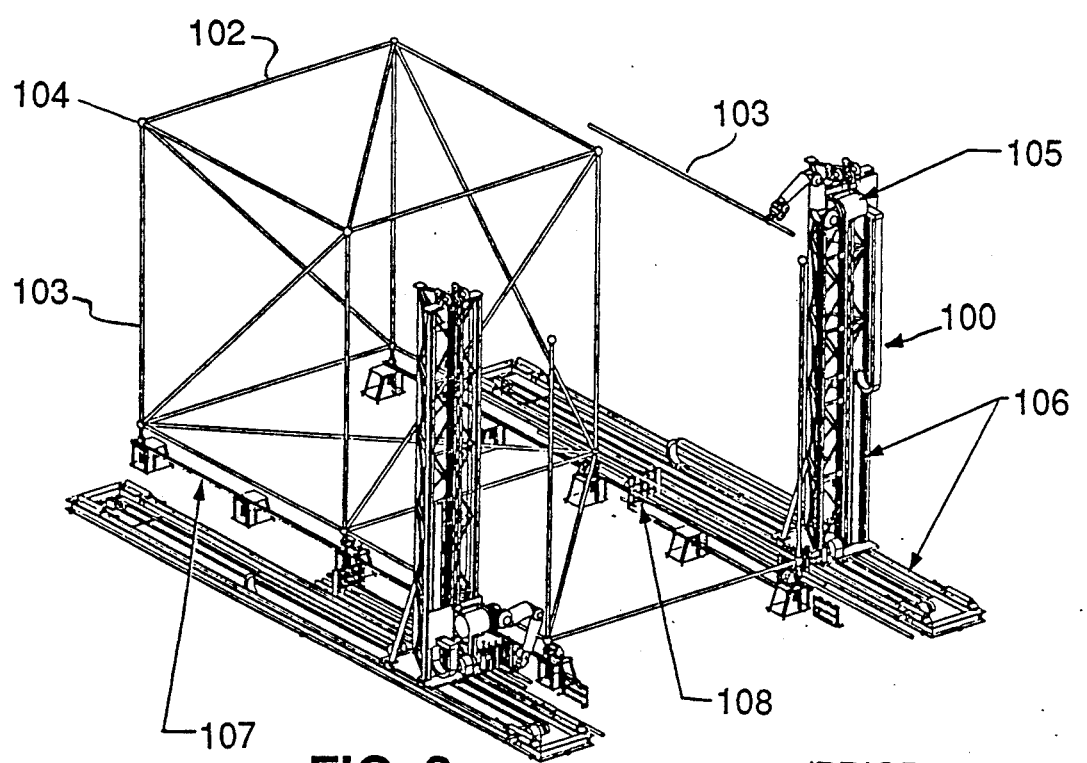
FIG. 2 is a schematic view of a joint test apparatus.

FIG. 2 illustrates a known prior art truss construction system 100 for constructing a truss 102 with truss members 103 and node balls 104. A robot manipulator 105 picks up and manipulates truss members 103. The robot has a special end effector designed to tighten truss members. An X-Y translation system 106 includes motor-driven sliding platforms and performs the functions of positioning the robot manipulators 105 so that each can reach four corners of the truss 102. A truss translation rail 107 functions to reposition the truss 102 so that the work area of the manipulators 105 is not limited to the reach limits of the X - Y translation system 106. Truss members are stored and supported on a truss member rack 108. Joints according to the present invention are useful as connectors in a truss 102.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A connector comprising
  a receptacle member having a receptacle recess therein defined by recess walls for receiving a joint member, and a receptacle slot in one of the recess walls communicating with the receptacle recess,
  a joint member having a head secured to a movable rod, part of the rod within the joint member and part of it with the head thereon extending outside the joint member,
  the head and a portion of the rod insertable into the receptacle recess so that a portion of the rod is receivable in the receptacle slot,
  tightening means in the joint member for moving the movable rod further into the joint member to secure the head against a wall of the recess;

the receptacle slot has a chamfered top entry into which and through which the portion of the rod is inserted, and the joint member has a curved protruding tongue for contacting the chamfered top entry to accommodate initial misalignment between the receptacle member and the joint member.

2. The connector of claim 1 wherein the movable rod is a threaded bolt and the tightening means comprises a rotatable threaded member which threadedly engages the bolt so that movement of the threaded member moves the bolt, and chuck gear means interconnected with the threaded member, the chuck gear means engageable with a chuck key so that rotation of the chuck key moves the chuck gear means thereby rotating the threaded member and moving the bolt.

3. The connector of claim 1 wherein the receptacle recess is sufficiently larger than the head and portion of the rod inserted into the receptacle recess to provide a large capture envelope for the head and the rod portion.

4. The connector of claim 1 wherein the head is generally cylindrical having a cylinder body, a circular end, and a rounded end portion for easy insertion into the receptacle slot and for accommodating initial misalignment between the receptacle member and the joint member.

5. The connector of claim 4 wherein a recess wall has a curved surface adjacent the receptacle slot for co-acting with the rounded end portion of the head and for accommodating initial misalignment between the receptacle member and the joint member.

6. The connector of claim 1 wherein
the receptacle slot has a clocking portion with parallel sides and
the rod has a portion with parallel flat sides for co-acting with the parallel sides of the receptacle slot clocking portion for clocking of the joint member with respect to the receptacle member.

7. The connector of claim 1 wherein
guide grooves are provided on the joint member to facilitate gripping of the joint member.

8. The connector of claim 1 wherein
the receptacle member and joint member are configured to accommodate misalignments between longitudinal axes of the receptacle member and the joint member of up to 28 degrees.

9. The connector of claim 1 comprising also
securement means connected to the receptacle member for securing the receptacle member to another structural member.

10. The connector of claim 9 wherein the securement means comprises
a threaded bolt movable in an opening in an end through the receptacle member.

11. The connector of claim 1 comprising also
preload means in the joint member for maintaining a preload on the connector.

12. A connector comprising
a receptacle member having a receptacle recess therein defined by recess walls for receiving a joint member, and a receptacle slot in one of the recess walls communicating with the receptacle recess, a joint member having a head secured to a movable threaded bolt part of which is within the joint member and part of it with the head thereon extending outside the joint member, the head and a portion of the rod insertable into the receptacle recess so that a portion of the rod is receivable in the receptacle slot, and tightening means in the joint member for moving the movable rod further into the joint member to secure the head against a wall of the recess, the tightening means comprising a rotatable threaded member which threadedly engages the bolt so that movement of the threaded member moves the bolt, chuck gear means interconnected with the threaded member, the chuck gear means engageable with a chuck key so that rotation of the chuck key moves the chuck gear means thereby rotating the threaded member and moving the bolt, receptacle recess sufficiently larger than the head and portion of the rod inserted into the receptacle recess to provide a large capture envelope for the head and the rod portion, the head is generally cylindrical having a cylinder body, a circular end, and a rounded end portion for easy insertion into the receptacle slot and for accommodating initial misalignment between the receptacle member and the joint member, a recess wall has a curved surface adjacent the receptacle slot for co-acting with the rounded end of the head and for accommodating initial misalignment between the receptacle member and the joint member, the receptacle slot has a chamfered top entry into which and through which the head and the portion of the rod are inserted, the joint member has a curved protruding tongue for contacting the chamfered top entry to accommodate initial misalignment between the receptacle member and the joint member, the receptacle slot has a clocking portion with parallel sides, the rod has a portion with parallel flat sides for co-acting with the parallel sides of the receptacle slot clocking portion for clocking of the joint member with respect to the receptacle member, guide grooves on the joint member facilitate gripping of the joint member, and the receptacle member and joint member are configured to accommodate misalignments of longitudinal axes of the receptacle member and joint member of up to 28 degrees.

13. The connector of claim 12 comprising also
securement means connected to the receptacle member for securing the receptacle member to another structural member, the securement means comprising a threaded bolt movable in an opening in an end through the receptacle member, and clocking pins on the end of the receptacle member for reception in recesses of the another structural member to correctly orient the receptacle member with respect to the another structural member.

* * * * *